United States Patent [19]

Gower

[11] 3,857,238

[45] Dec. 31, 1974

[54] CONNECTOR HOOK HAVING ARCUATE CHANNEL ON FACE OF FLARED HEAD

[76] Inventor: Roger L. Gower, Suite 302, 1911 Jefferson Davis Hwy., Arlington, Va. 22202

[22] Filed: Mar. 19, 1973

[21] Appl. No.: 342,352

[52] U.S. Cl. .................................. 59/93, 152/241
[51] Int. Cl. ...................... F16g 15/04, B60c 27/08
[58] Field of Search ........ 59/93; 152/241, 231, 233, 152/213 A

[56] References Cited
UNITED STATES PATENTS

| 2,995,889 | 8/1961 | Johnson | 59/93 |
| 3,424,219 | 1/1969 | Gower | 59/93 |
| 3,495,400 | 2/1970 | Gower | 59/93 |
| 3,511,527 | 5/1970 | Gower | 59/93 |

Primary Examiner—C. W. Lanham
Assistant Examiner—Gene P. Crosby
Attorney, Agent, or Firm—Pollock, Philpitt & Vande Sande

[57] ABSTRACT

This disclosure relates to a connector hook for use with electric welded chain having controlled flash. An arcuate channel at the top of the plate face forming the head permits the head to pass the flash on the welded side of the chain link, and accidental disengagement is minimized because the insertion and removal of the plate which forms the head of the hook can be effected only when the arcuate channel passes the side of the link having the welding flash; if the head is turned in the opposite direction, disengagement is impossible because of insufficient clearance.

3 Claims, 5 Drawing Figures

CONNECTOR HOOK HAVING ARCUATE CHANNEL ON FACE OF FLARED HEAD

This invention constitutes an improvement over my U.S. Pat. Nos. 3,424,219 and 3,511,527, wherein I have disclosed my "COBRA-HEAD" hook, being a hook having a conventional shank and a flattened, plate-like head and defined arcuate concavities on the periphery thereof to permit simple, rapid insertion of the head through a link of chain, and easy removal upon proper manipulation.

With the increasing use of electric welded chain, the problem has arisen of providing clearance for the palte-like head of a detachable connector device past the flash on the chain link. The "flash" on links of electric-welded chain is the annular enlargement which is created by the butt welding employed to effect the juncture of the ends of a peice of bar stock bent into an open-side chain link. This flash is located substantially midway on one side of the chain link. Irregularities in the surface of the flash may be removed by tumbling the chain in a rotating tumbling barrel; or by use of trimming dies; or by machining, for controlled flash such as may be required for use with the hook of the present invention; or by any other desirable method.

With the size of the flash controlled, the link possesses a contour and dimensions that will permit the mating of the flash with the groove at the top of the plate which forms the present invention.

For a better understanding of this invention, reference may be had to the accompanying drawings, in which FIG. 1 is a front elevation of the hook head;

Figure 1:
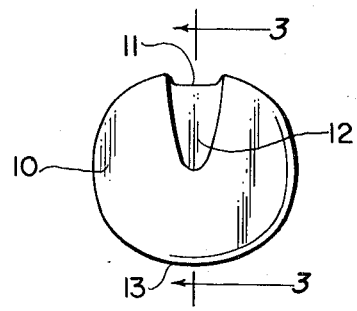

Referring more particularly to the drawings:

In FIG. 1 there is shown the head 10 of a hook wherein a concave curvature 11 is provided at the top of the face of the head, said concavity being continued in a tapered arcuate channel 12 extending from the edge of the head toward the center of the face thereof; said head terminating in leading border 13.

Figure 2:
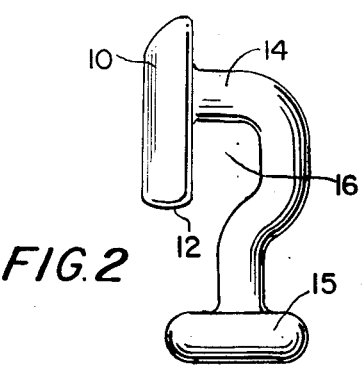
FIG. 2 is a side elevation of the same.

The side view of FIG. 2 shows the substantially parallel face and rear sides of the head, said head being integrally connected to a shank 14 which is integrally connected to a base 15, said shank and said head being so connected as to create throat 16.

Figure 3:
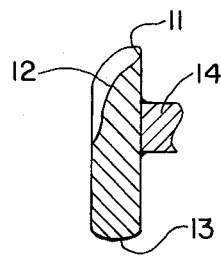
FIG. 3 is a cross-section taken on line 3—3 of FIG. 1.
Figure 4:
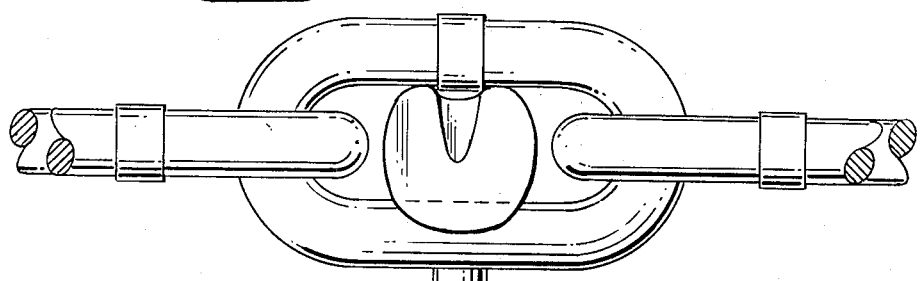
FIG. 4 shows the head of a hook properly inserted through a chain link.
Figure 5:
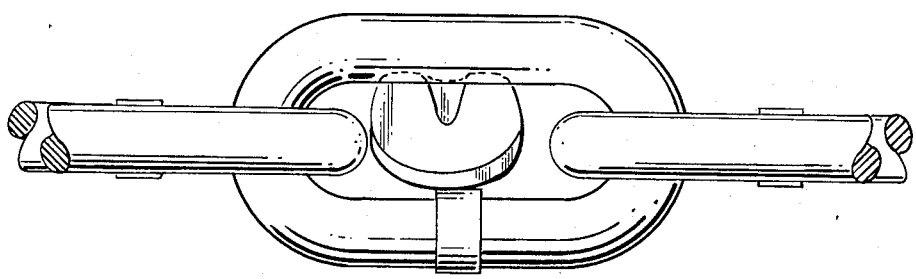
FIG. 5 shows the head improperly disposed so that the leading edge of the face plate is unable to pass the flash of the electric weld juncture.

In Figure 3 there is shown the tapered arcuate channel 12 commencing at arc 11, said channel permitting movement of the head past the flash of a link of electric welded chain.

Since chain prices are usually computed by weight, it is important for purposes of economy to employ the smallest size chain that will carry a designated load. However, when smaller chain is used, the hooks and fittings that are used with it may be of dimensions and stock insufficient to meet the required stress. With the present invention, a hook of heavier shank stock and having a stronger plate-like head may be employed provided there is clearance of the head past the flash of the link.

For this purpose, in the present invention there is an arcuate channel at the top of the plate-like head, said channel extending centrally and partially across the face of the head parallel to the link defined by the shank of the hook. When the head is inserted through a chain link, the conventional throat of the hook engages the side of the link opposite the flash. This permits close encompassment of the bar stock of the link within the throat of the hook, while the arcuate channel on the face of the plate-like head travels easily past the flash on the opposite side of the link.

The effectiveness of this head may be confirmed by attempting to insert the head through a chain link with the throat of the hook engaging the flash. The top of the plate will not pass the bar on the opposite side of the link. But upon retracting the hook and turning it 180 degrees, the throat engages the straight bar and the head passes the flash with ease. Thus, in addition to requiring a right-angle engagement of the hook and the link through which it is inserted, the head of this invention makes it imperative that the head be inserted from the proper side of the link. Accidental disengagement, therefore, is reduced to a minimum possibility because removal requires the same contiguity of the arcuate channel and the flash. Thus the features of this head recommend it for the safety programs being conducted in many areas of industry.

Additional safety may be achieved by mounting the plate-like head with the topmost portion rising above the shank of the hook to which the head is integrally connected, thus necessitating manipulation of the hook to provide for clearance of the arcuate channel on the head past the flash on the inner perimeter of the chain link.

Having thus disclosed my invention, I claim:

1. In combination, a hook having a shank, a throat, a plate-like head having a face, said head being formed integrally with the said shank, and upon the face of said head, an arcuate channel beginning at a substantially central point on said face and extending toward the border thereof where it will terminate adjacent the side of said shank outermost from said throat, said channel thus permitting movement of said plate past the flash of a link of electric welded chain.

2. The invention of claim 1 wherein said head is connected to the end of said shank at a noncentral point on the side of said plate opposite said arcuate channel.

3. The invention of claim 1 wherein the leading edge of said plate-like head defines an arc sufficient to accommodate the nominal bar stock of a link of chain and insufficient to receive and mate with the flash on a link of electric welded chain formed of like nominal bar stock, thus preventing the head from passing the portion of the chain link on the opposite side from the flash and thereby becoming disengaged.

* * * * *